(12) United States Patent
Lee et al.

(10) Patent No.: US 12,099,663 B2
(45) Date of Patent: Sep. 24, 2024

(54) POP UP CUSTOMIZABLE CLICK FEELING KEYS FOR A KEYBOARD

(71) Applicant: DELL PRODUCTS L.P., Round Rock, TX (US)

(72) Inventors: JerYo Lee, Taipei (TW); Cheng-Hsiang Chuang, New Taipei (TW); Chun-Ting Lu, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/167,269

(22) Filed: Feb. 10, 2023

(65) Prior Publication Data
US 2024/0272727 A1 Aug. 15, 2024

(51) Int. Cl.
*G06F 1/16* (2006.01)
*G06F 3/01* (2006.01)
*G06F 3/02* (2006.01)

(52) U.S. Cl.
CPC .......... *G06F 3/0202* (2013.01); *G06F 1/1662* (2013.01); *G06F 3/016* (2013.01)

(58) Field of Classification Search
CPC ................................ G96F 3/0202; G06F 3/016
See application file for complete search history.

(56) References Cited

U.S. PATENT DOCUMENTS

| | | | |
|---|---|---|---|
| 10,234,960 B1 * | 3/2019 | Bharadwaj | G06F 3/0213 |
| 2006/0132446 A1 * | 6/2006 | Soh | G06F 3/0202 345/168 |
| 2013/0154940 A1 * | 6/2013 | Gan | G06F 1/1666 345/168 |
| 2017/0123508 A1 | 5/2017 | Hampton et al. | |
| 2018/0313528 A1 | 11/2018 | Morrison et al. | |
| 2020/0371603 A1 * | 11/2020 | Kotta | G06F 3/0202 |

\* cited by examiner

*Primary Examiner* — Kevin M Nguyen
(74) *Attorney, Agent, or Firm* — Larson Newman, LLP

(57) ABSTRACT

An information handling system includes a keyboard with multiple customizable click feeling keys. A first customizable click feeling key includes a keycap magnet and an electromagnet. The keycap magnet includes a first magnetic polarity portion and a second magnetic polarity portion. The system communicates individually with each of the customizable click feeling keys to determine a mode. Based on the mode being a first mode, the system provides a first current to the electromagnet to generate a first magnetic pole strength within the electromagnet. Based on the mode being a second mode, the system provides a second current to the electromagnet to generate a second magnetic pole strength within the electromagnet. The second magnetic pole strength creates a stronger repulsion force between the electromagnet and the keycap magnet.

19 Claims, 8 Drawing Sheets

POP UP CUSTOMIZABLE CLICK FEELING KEYS FOR A KEYBOARD

FIELD OF THE DISCLOSURE

The present disclosure generally relates to information handling systems, and more particularly relates to pop up customizable click feeling keys for a keyboard.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a keyboard having multiple customizable click feeling keys. A first customizable click feeling key includes a keycap magnet and an electromagnet. The keycap magnet includes a first magnetic polarity portion and a second magnetic polarity portion. A processor may communicate individually with each of the customizable click feeling keys. The processor may determine a mode of the information handling system. Based on the mode being a first mode, the processor may provide a first current to the electromagnet to generate a first magnetic pole strength within the electromagnet. Based on the mode being a second mode, the processor may provide a second current to the electromagnet to generate a second magnetic pole strength within the electromagnet. The second magnetic pole strength may create a stronger repulsion force between the electromagnet and the keycap magnet.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
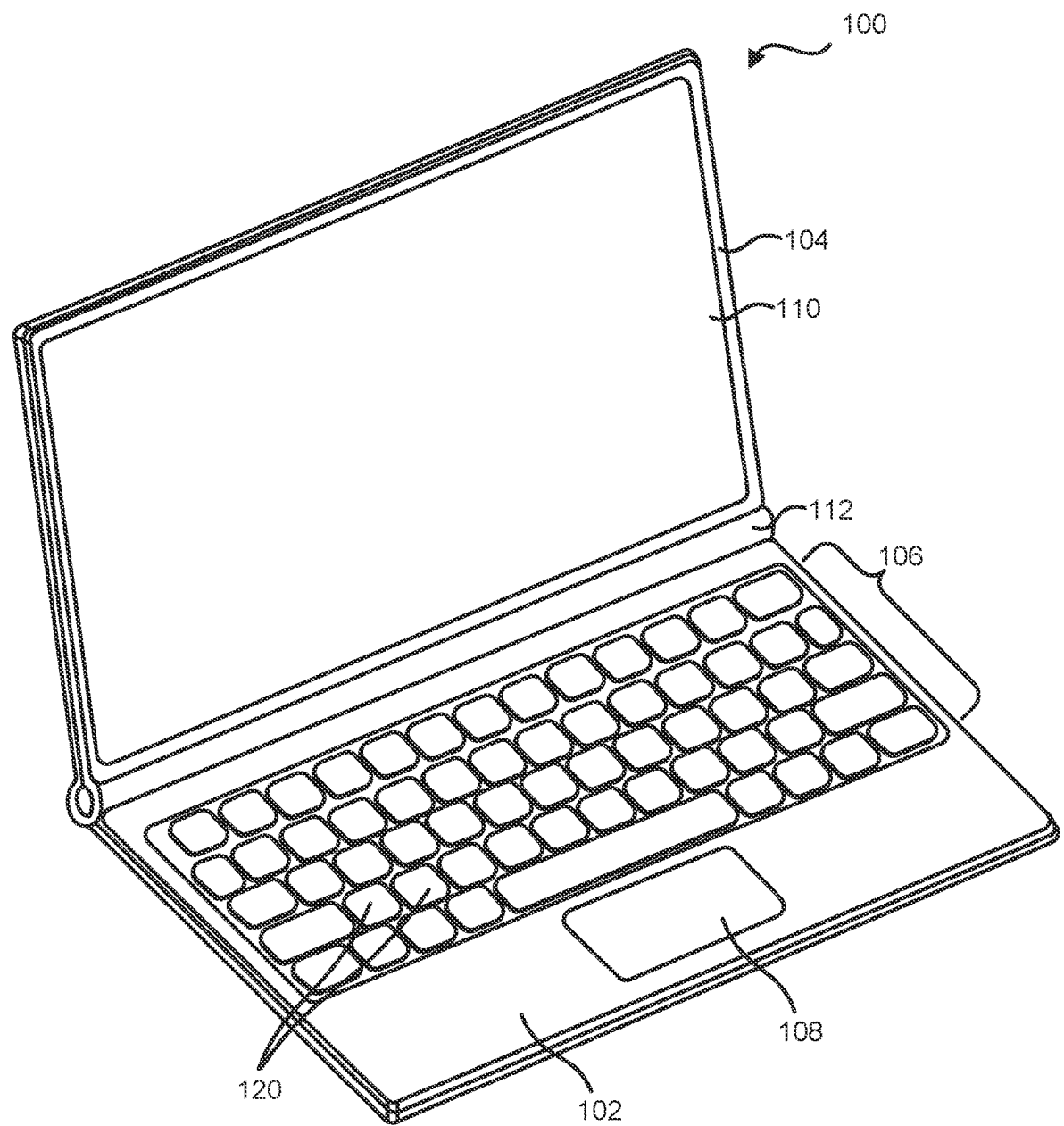
FIG. 1 is a perspective view of an information handling system according to at least one embodiment of the present disclosure.

FIG. 1 an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a base portion 102 and a top 104. Base portion 102 includes a keyboard 106 and a touchpad 108, and top portion 104 includes a display device 110. In an example, touchpad 108 may be any suitable pointing device. Base portion 102 is connected top portion 104 via a mechanism 112, such as one or more hinges. Keyboard 106 includes multiple keys 120. When the information handling system 100 comprises a 2-in-1 device, mechanism 112 may enable the top portion 104 to be connected to bottom portion 102 for use as a laptop device and may enable the top portion 104 to be detached from bottom portion 102 to enable the top portion 104 to be used as a tablet information handling system. Display device 110 may include one or more light emitting devices, such as, for example, light emitting diodes (LEDs), organic LED (OLED), liquid crystal display (LCD), another type of light emitting device, or any combination thereof.

Previous keyboards may include keys with different kinds of click feelings, such as a rubber dome feeling, a clicky feeling, a tactile feeling, a linear feeling, or the like. However, each previous keyboard has a fixed click feeling, such that switches or key components of previous keyboards can only provide fixed force curves. Based on this fixed click feeling for a previous keyboard, users can only experience one type of click feeling per keyboard. In this situation, if a user wants different click feelings, the user would have to utilize a different keyboard.

In certain examples, users of information handling system 100 may customize and change different click feelings of keys 120 in keyboard 106 in different applications like clicky feeling for gaming, and small force feeling for office work. Keys 120 may provide real-time active feedback to gamers to improve gaming experience. In an example, keyboard 106 may include pop-up designs of keys 120 to save more space for other functions and to prevent keycap damage of the keys.

Figure 2:
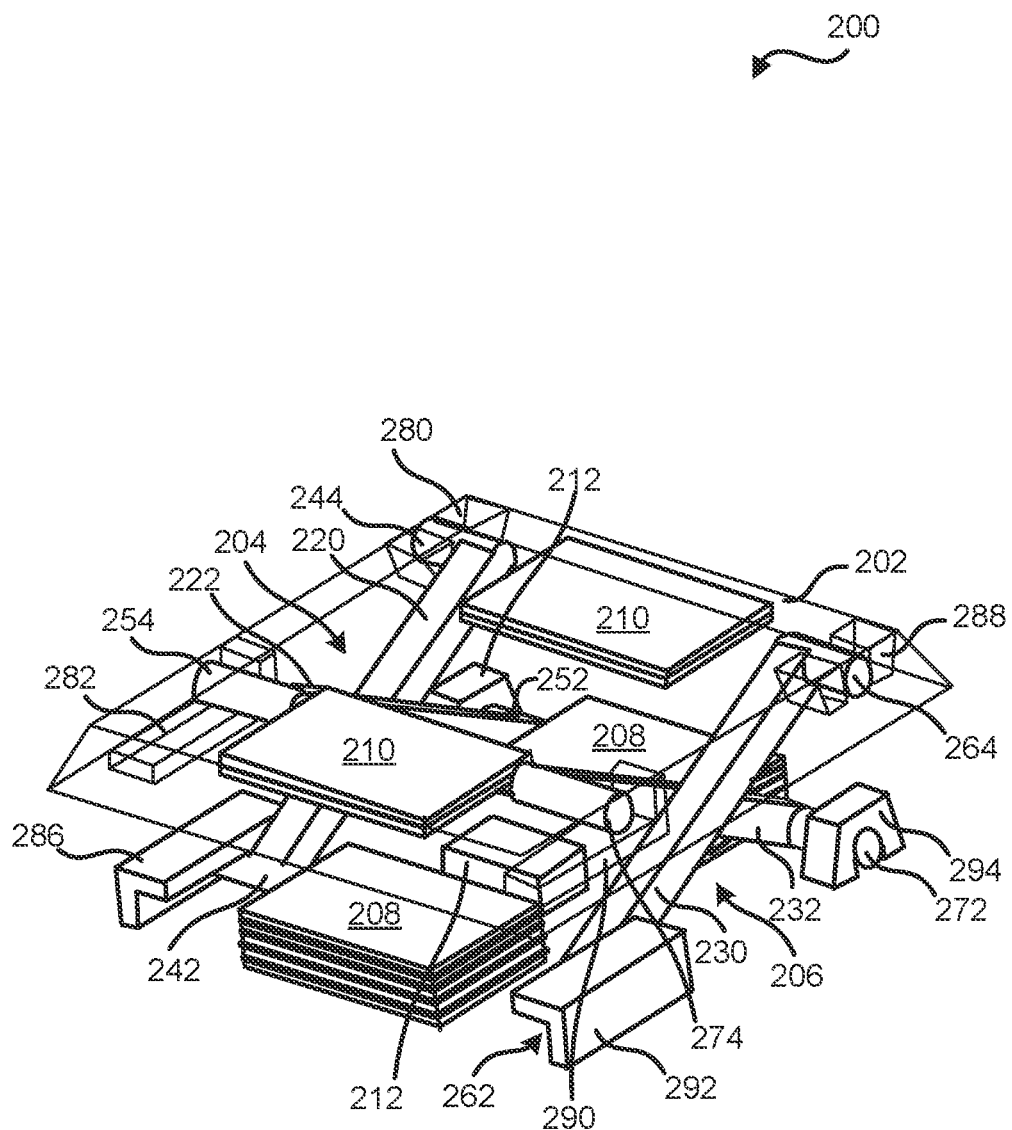
FIG. 2 is a perspective view of a customizable click feeling key for a keyboard according to at least one embodiment of the present disclosure.

FIG. 2 illustrates a customizable click feeling key 200 for a keyboard, such as keyboard 106 of FIG. 1, according to at least one embodiment of the present disclosure. Customized click feeling key 200 may be substantially similar to each key 120 of FIG. 1. Customized click feeling key 200 includes a keycap 202, scissor mechanisms 204 and 206, electromagnets 208, keycap magnets 210, and a hall effect sensor 212. Keycap magnets 210 are mounted within an inner surface of top portion of keycap 202. Keycap magnets 210 may be located on distal edges of the inner surface of the top portion of keycap 202. Scissor mechanism 204 includes supports 220 and 222, and scissor mechanism 206 includes supports 230 and 232. In an example, supports 220 and 222 may be securely connected to each other at midpoints of each of the supports. Similarly, supports 230 and 232 may be securely connected to each other at midpoints of each of the supports.

Support 220 includes extension portions 242 and 244. Extension portion 242 extends from a first end of support 220 and extension portion 244 extends from a second end of the support. Extension portions 242 and 244 both extend away from support 220 in the same direction. In an example, first and second ends of support 220 are distal ends with respect to one another. Support 222 includes extension portions 252 and 254. Extension portion 252 extends from a first end of support 222 and extension portion 254 extends from a second end of the support. Extension portions 252 and 254 both extend away from support 222 in the same direction. In an example, first and second ends of support 222 are distal ends with respect to one another.

Support 230 includes extension portions 262 and 264. Extension portion 262 extends from a first end of support 230 and extension portion 264 extends from a second end of the support. Extension portions 262 and 264 both extend away from support 230 in the same direction. In an example, first and second ends of support 230 are distal ends with respect to one another. Support 232 includes extension portions 272 and 274. Extension portion 272 extends from a first end of support 232 and extension portion 274 extends from a second end of the support. Extension portions 272 and 274 both extend away from support 232 in the same direction. In an example, first and second ends of support 232 are distal ends with respect to one another.

Customizable click feeling key 200 includes brackets 280, 282, 284, 286, 288, 290, 292, and 294, which may be utilized to control the movement of keycap 202. In an example, brackets 280, 284, 288, and 294 may secure keycap 202 to a surface of a base portion of an information handling system, such as base portion 102 of information handling system 100 of FIG. 1. For example, bracket 280 may securely hold extension portion 244 of support 220 to the inner surface of keycap 220. Similarly, bracket 288 may securely hold extension portion 264 of support 230 to the inner surface of keycap 220. Bracket 284 may securely hold extension portion 252 of support 222 to the base portion of an information handling system, such as base portion 102 of information handling system 100 of FIG. 1. Similarly, bracket 294 may securely hold extension portion 272 of support 232 to base portion of an information handling system, such as base portion 102 of information handling system 100 of FIG. 1.

In an example, bracket 282 may form a channel for extension portion 254 of support 220 to move along the inner surface of keycap 220. Similarly, bracket 290 may form a channel for extension portion 274 of support 232 to the inner surface of keycap 220. Bracket 286 may form a channel for extension portion 242 of support 220 to move along the base portion of an information handling system, such as base portion 102 of information handling system 100 of FIG. 1. Similarly, bracket 292 may form a channel for extension portion 262 of support 230 to move along the base portion of an information handling system, such as base portion 102 of information handling system 100 of FIG. 1.

In certain examples, the polarity of electromagnets 208 may be controlled by a current provided through coils of the electromagnets. In an example, the polarity of electromagnets 208 may be set so that the electromagnets repel keycap magnets 210 while current is provided through the electromagnets. A force created by the repelling of keycap magnets 210 by electromagnets 208 may be controlled by the amount of current provided through the electromagnets as will be described with respect to FIG. 3 below. In certain examples, adjusting currents through electromagnets 208 may create these different forces at different travel times. In these examples, the different forces may simulate different force-travel curves, which may allow users to experience different click feelings in different modes, and may also provide instant real-time click feelings for individual keys during gaming modes of information handling system 100. In an example, hall effect sensor 212 may capture a motion of keycap 202 by analyzing a magnetic flux density change between electromagnets 208 and keycap magnets 210.

Figure 3:
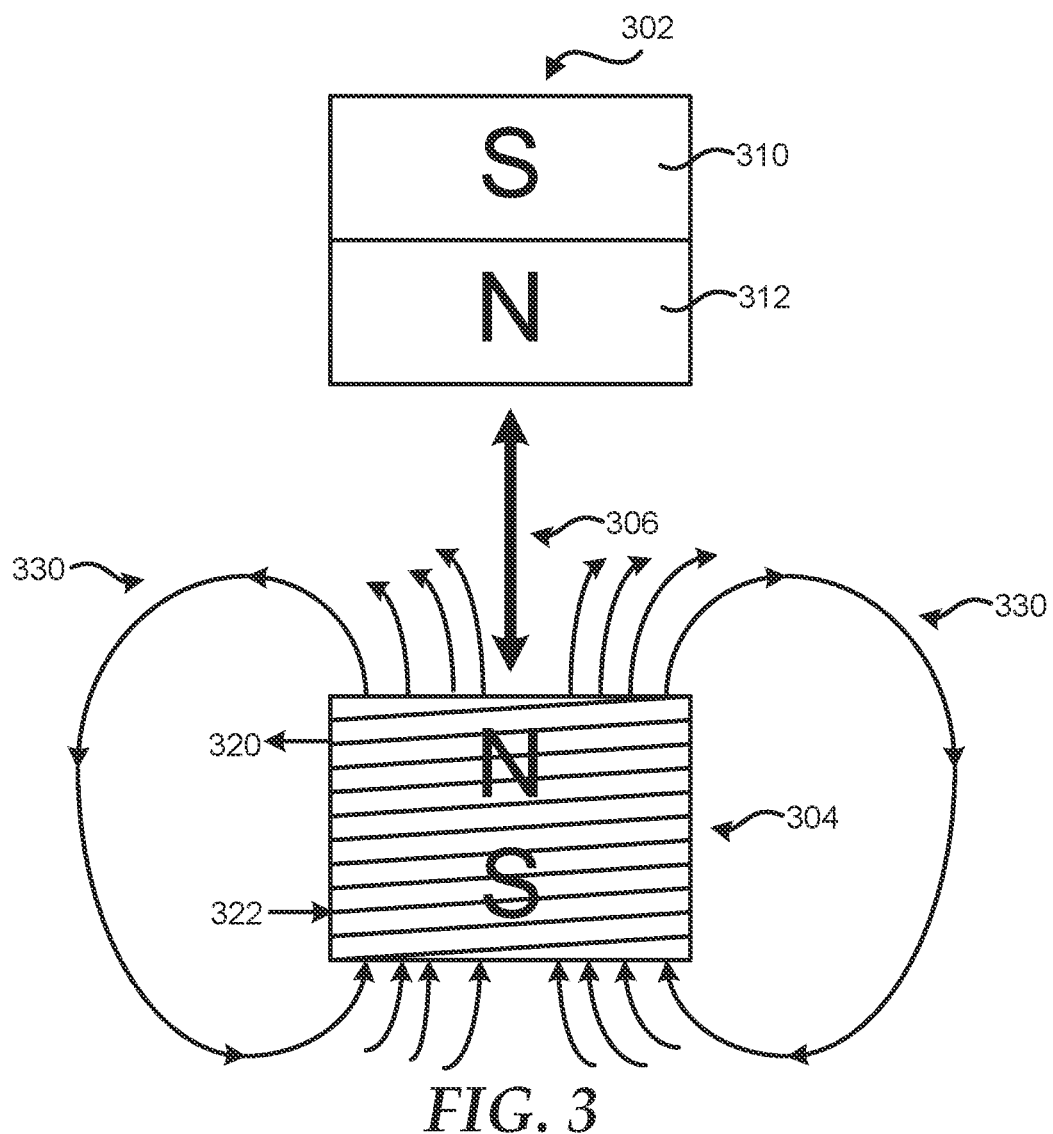
FIG. 3 is a diagram of a keycap magnet and an electromagnet for a customizable click feeling key according to at least one embodiment of the present disclosure.

FIG. 3 illustrates a keycap magnet 302 and an electromagnet 304 for a customizable click feeling key, such as customizable click feeling key 200 of FIG. 2, according to at least one embodiment of the present disclosure. When activated, electromagnet 304 may exert a force 306 on keycap 302 based on the created magnetic polarity of the electromagnet. Keycap magnet 302 includes permanent magnetic polarities 310 and 312. In an example, one of the magnetic polarities 310 and 312 has a south magnetic polarity and the other has a north magnetic polarity. For example, in a first configuration magnetic polarity 310 may be a south magnetic polarity and magnetic polarity 310 may be a north magnetic polarity. In a second configuration magnetic polarity 310 may be a north magnetic polarity and magnetic polarity 310 may be a south magnetic polarity. While the magnetic polarities 310 and 312 may be any suitable configuration, keycap magnet 302 will be described herein in the first configuration with magnetic polarity 310 being a south magnetic polarity and magnetic polarity 310 being a north magnetic polarity.

In certain examples, electromagnet 304 includes terminals 320 and 322, and both of the terminals may be connected to a current source. In an example, one of terminals 320 and 322 may receive a current from the current source and the other terminal may provide a return path for the current. The magnetic polarity of electromagnet 304 may be controlled based on a direction of current provided through the coils of the electromagnet via terminals 320 and 322. The direction of the current within electromagnet 304 may create a magnetic flux 330 as illustrated in FIG. 3. In certain examples, a strength of magnetic flux 330 may be effected by both the current through electromagnet 304 and a distance between the electromagnet and keycap magnetic 302.

In an example, force 306 between two poles may be related to the magnetic pole strength of keycap magnet 302 and electromagnet 304. As described above, the magnetic pole strength of electromagnet 304 may be controlled by the current provided through the electromagnet via terminals 320 and 322. In certain examples, force 306 may be calculated in any suitable manner, such as equation 1 below:

$$F = \frac{\mu_0 m_{magnet} m_{electromagnet}}{4\pi r^2} \quad \text{EQ. 1}$$

In equation 1 above, $\mu_0$ is an initial permeability of keycap 302 and electromagnet 304, $m_{magnet}$ is the magnetic pole strength of the keycap, and $m_{electromagnet}$ is the magnetic pole strength of the electromagnet, and r is the radius of the core of the electromagnet. In an example, electromagnets, such as electromagnet 304, may turn ferromagnetic materials into magnets when a current flows through wire coils. The magnetic field (B) and the magnetic pole strength ($m_{electromagnet}$) may be changed by controlling the amount of electric current (I) provided through the coils, such as via terminals 320 and 322. In certain examples, the magnetic pole strength ($m_{electromagnet}$) of electromagnet 304 may be calculated via any suitable manner, such as equation 2 below:

$$m_{electromagnet} = \frac{NIA}{L} \quad \text{EQ. 2}$$

In equation 2 above, N is the number of turns of the coil in electromagnet 304, I is the current in the wire of the electromagnet, A is the cross sectional area of the core of, and L is the total length of a magnetic field path in the electromagnet. When equation 2 is inserted within equation 1 a new equation for force 306 may be represented by equation 3 below:

$$F = \frac{\mu_0 m_{magnet} NIA}{4\pi r^2 L} \quad \text{EQ. 3}$$

In an example, the magnetic field (B) produced by electromagnet 304 may be calculated via any suitable manner such as equation 4 below:

$$B = \frac{NI\mu}{L} \quad \text{EQ. 4}$$

In certain examples, the equations above may be utilized to calculate a current needed to create a particular magnetic field and a particular magnetic pole strength within electromagnet 304. Additionally, the equations above may be utilized to calculate different amounts of current needed to generate different forces 306 between keycap magnet 302 and electromagnet 304.

Figure 4:
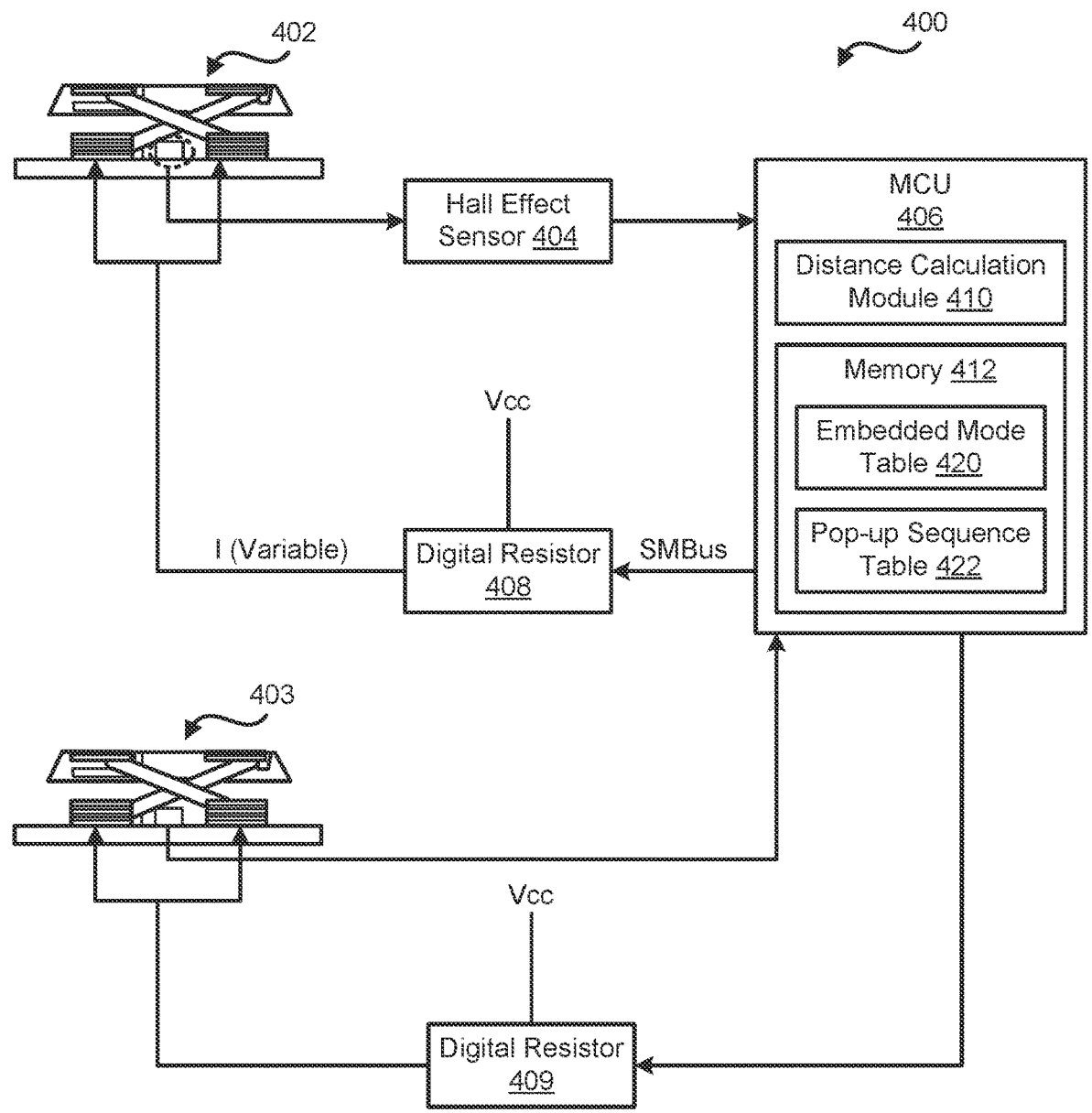
FIG. 4 is a diagram of a control system for a customizable click feeling key according to at least one embodiment of the present disclosure.

FIG. 4 illustrates a control system 400 for customizable click feeling keys 402 and 403 of an information handling system according to at least one embodiment of the present disclosure. Each of customizable click feeling keys 402 and 403 include a hall effect sensor, such as hall effect sensor 404 of customizable click feeling key 402. Control system 400 includes a microcontroller unit/processor 406, and digital resistor 408 and 409. In an example, hall effect sensor 404 is part of customizable click feeling key 402 as shown by the dashed circle, but has been shown separately to add clarity to control system 400. Processor 406 includes a distance calculation module 410 and a memory or storage 412. Memory 412 may store any suitable data for control of customizable click feeling keys including, but not limited to, an embedded mode table 420 and a pop up sequence table 422. While only two customizable click feeling keys 402 and 403 are shown in FIG. 4, an information handling system may include any suitable number of customizable click feeling keys without varying from the scope of this disclosure.

While memory 412 is shown as being internal to processor 406, the memory may be located in any location of an information handling system, such as information handling system 100, without varying from the scope of this disclosure. In certain examples, processor 406 may utilize embedded mode table 420 to change a click feeling of customized click feeling keys 402 and 403 based on an operation mode of the information handling system as will be described below. Processor 406 may utilize pop up sequence table 422 to determine how customizable click feeling keys 402 and 403 are activated as will be described below.

In an example, a first power state change of an information handling system is detected. In an example, the power state change may be from a low power state to an activate power state. The low power state of the information handling system may be a powered down state, a sleep state, or the like. The activate power state may be a power state during a boot operation of the information handling system, during execution of an operating system (OS) in the information handling system, or the like. If the information handling system is a portable computer, such as a laptop computer, the power state change may result from the lid or top, such as top 104 of FIG. 1, being opened.

Based on the information handling system being activated, such as in response to the lid of a laptop being opened, processor 406 may activate customized click feeling keys 402 and 403. For brevity and clarity, activation of customizable click feeling keys will be described with respect to customizable click feeling key 402. In an example, processor 406 may provide a control signal to digital resistor 408 via any suitable communication bus, such as a system management bus (SMBus), and the control signal may control the resistance of the digital resistor. Based on the activation of digital resistor 408, a current may be provided to the electromagnets of customizable click feeling key 402. In certain examples, processor 406 may provide different control signals to digital resistor 408, and each of the different control signals may cause the digital resistor to have different resistances. Based on the different resistance values of digital resistor 408, different currents may be provided to customizable click feeling key 402.

In response to a current being provided to the electromagnets of customizable click feeling key 402, the electromagnets may generate magnetic field to activate the customizable click feeling key. In an example, the activation of customizable click feeling key 402 may cause a keycap of the key to pop up from a closed position to an open position. The transition of the keycap from the closed position to the open position may be caused by the electromagnets generating magnetic fields, which in turn repel the keycap magnets secured within an inner surface of the keycap. In an example, the keycap magnets may be repelled from the electromagnets because the magnet fields may cause the electromagnets to have the same magnetic polarity as the keycap magnets.

In an example, before activating customizable click feeling keys 402 and 403, processor 406 may determine whether a customized pop-up sequence is stored within pop up sequence table 422. In certain examples, a customized pop-up sequence may be any suitable manner or sequence to activate the customizable click feeling keys in a keyboard of the information handling system, such as keys 120 in keyboard 106 of FIG. 1. Each customizable click feeling key in an information handling system may have separate connections to processor 406. For example, customizable click feeling key 402 may be connected to processor 406 via hall effect sensor 404 and digital resistor 408, and customizable click feeling key 403 may be connected to processor 406 via hall effect sensor 405 and digital resistor 409. Based on these separate connections, processor 406 may individual activate, control, and deactivate customizable click feeling keys 402 and 403.

In an example, the separate control of customizable click feeling keys 402 and 403 may enable processor 406 to activate the customizable click feeling keys at different times based on the customized pop-up sequence. For example, the customized pop-up sequence may cause different subsets of the customizable click feeling keys 120 of FIG. 1 to be activated at different times. In an example, the customizable click feeling keys may be activated in a pattern from one side of the keyboard to the other, such as the click feeling keys may pop-up a 'wave' pattern across the keyboard. In another example, the customizable click feeling keys may be activated in a random pattern, such that the click feeling keys may pop-up at random. While only two customized pop-up sequences have been described, a customized pop-up sequence may be any design selected by a user of the information handling system. If processor 406 determines that a customized pop-up sequence is not stored in customized pop-up sequence table 422, the processor may activate all customizable click feeling keys, such as keys 402 and 403, at the same time.

In certain examples, processor 406 may determine whether one or more customized click feeling settings are stored in embedded mode table 420 of memory 412. In an example, each of the different customized click feeling settings may be created based on different amounts of force being created between an electromagnet and a keycap magnet of customizable click feeling key 402. In this example, the different forces may create different click feelings by requiring different amounts of user forces to click customized click feeling key 402. As described above, processor 406 may control a resistance of digital resistor 408, which may cause different currents to be provided to the electromagnets of customizable click feeling key 402.

In an example, each of the different customized click feeling settings of embedded mode table 420 may correspond to a different operation mode of the information handling system. If one or more customized click feeling settings are stored, a customized click feeling is implemented based on an operation mode of the information handling system. In an example, processor 406 may determine the operation mode of the information handling system and implement the corresponding customized click feeling setting based on controlling the resistance of digital resistor 408. In certain examples, the operation mode of the information handling system may be any suitable mode of the information handling system including, but not limited to, a racing mode, a gaming mode, and a normal mode.

In certain examples, after all of the customizable click feeling keys are activated and the information handling system is operating in any suitable mode, processor 406 may determine whether a haptic feedback mode has been selected. If the haptic feedback mode has been selected, processor 406 may perform one or more suitable operations to implement the haptic feedback mode. For example, processor 406 may receive and process data from hall effect sensor 404 to determine whether a user has exerted a force on customizable click feeling key 402. In an example, hall effect sensor 404 may capture a motion of the keycap of key 402 by analyzing a magnetic flux density change between the electromagnets and the keycap magnets of the customizable click feeling key.

Hall effect sensor 404 may provide the detected magnetic flux density change to distance calculation module 410 of processor 406. Based on the detected magnetic flux density change, distance calculation module 410 may determine a distance between the keycap magnets and the electromagnets of customized click feeling key 402. In an example, distance calculation module 410 may have a predetermined distance between the keycap magnetics and the electromagnets when customized click feeling key 402 is in the open position. Based on the calculated distance being less than the predetermined distance, distance calculation module 410 may determine that a user force has been applied to customized click feeling key 402.

In response to both the haptic feedback mode and the detected user force, processor 406 may generate haptic feedback in customized click feeling key 402. In an example, processor 406 may send multiple control signals to digital resistor 408 and each of the control signals may result in a different resistance of the digital resistor. In certain examples, processor 406 may provide any suitable number of control signals to digital resistor 408 to create the haptic feedback. For example, a first control signal may cause digital resistor 408 to have a first resistance value and a second control signal may cause the digital resistor to have a second resistance value. In an example, the first resistance value may be larger than the second resistance value. In this example, the first resistance value may generate a current that when applied to the electromagnets of the customizable click feeling key 402 may cause the electromagnets to repel the keycap magnets. The second resistance value may be substantially low such that digital resistor 408 may operate as a short. In response to digital resistor 408 being a short, no current is provide to the electromagnets of customizable click feeling key 402 and the electromagnets do not have a magnetic polarity. In this situation, the keycap of customizable click feeling key 402 may drop based on gravity and the keycap magnets being attached to the ferromagnetic materials in the electromagnets.

In an example, processor 406 may create the haptic feedback of customizable click feeling key 402 based on waiting a particular length of time between providing the first and second control signals to digital resistor 408. The length of time between the first and second control signals may be substantially the same length of time between activating and deactivating the electromagnets of customizable click feeling key 402. In an example, the length of time may be any suitable amount of time, such as 1 millisecond, 2 milliseconds, 3 milliseconds, or the like. The length of time may create a rapid change in the magnetic polarity of the electromagnets, which may cause the keycap of key 402 to vibrate up and down. In an example, vibrating of the keycap may create haptic feedback of customizable click feeling key 402, which may be used to provide real-time haptic feedback in gaming operations of an information handling system, such as information handling system 100 of FIG. 1.

Figure 5:
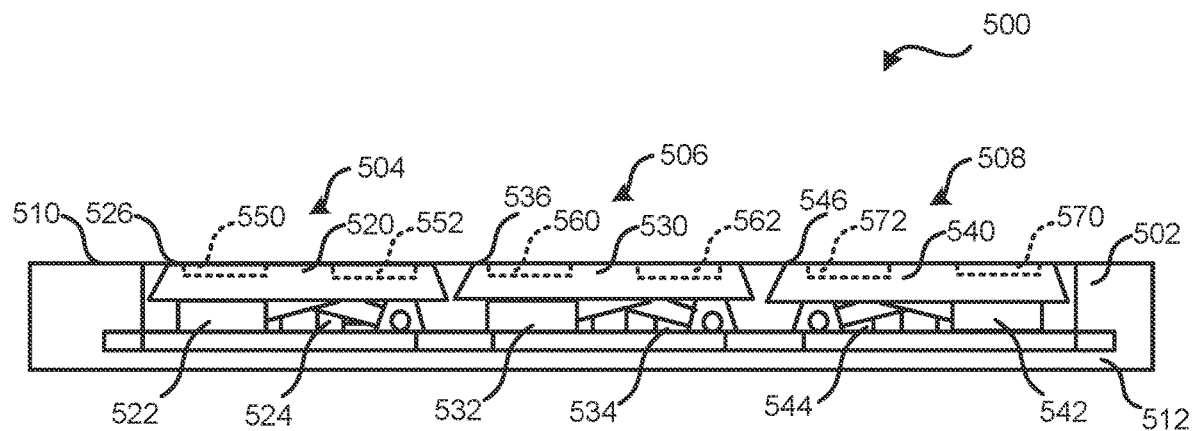
FIG. 5 is a side view of multiple customizable click feeling keys in a closed position according to at least one embodiment of the present disclosure.
Figure 6:
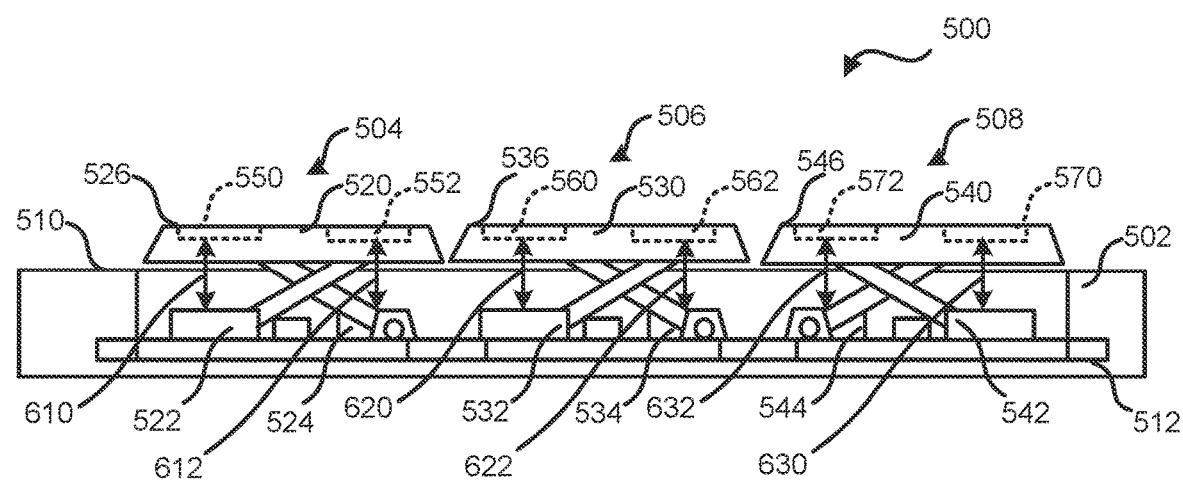
FIG. 6 is a side view of multiple customizable click feeling keys in an open position according to at least one embodiment of the present disclosure.

FIGS. 5 and 6 illustrate a portion of an information handling system 500 including a base 502 and customizable click feeling keys 504, 506, and 508 according to at least one embodiment of the present disclosure. Information handling system 500 may be substantially similar to information handling system 100 of FIG. 1. Base 502 includes a top surface 510 and a bottom surface 512. Customizable click feeling key 504 includes a keycap 520 and electromagnets 522 and 524. Keycap 520 has a top surface 526. Customizable click feeling key 506 includes a keycap 530 and electromagnets 532 and 534. Keycap 530 has a top surface 536. Customizable click feeling key 508 includes a keycap 540 and electromagnets 542 and 544. Keycap 540 has a top surface 546. Customizable click feeling key 504 includes keycap magnets 550 and 552 secured on an inner surface of keycap 520. Customizable click feeling key 506 includes keycap magnets 560 and 562 secured on an inner surface of keycap 530. Customizable click feeling key 508 includes keycap magnets 570 and 572 secured on an inner surface of keycap 540. In an example, customizable click feeling keys 504, 506, and 508 may be substantially similar to keys 120 of FIG. 1, and customizable click feeling key 200 of FIG. 2. Information handling system 500 may include any suitable number of customizable click feeling keys without varying from the scope of this disclosure.

FIG. 5 illustrates customizable click feeling keys 504, 506, and 508 in a closed position. In certain examples, top surfaces 526, 536, and 546 of respective keycaps 520, 530, and 540 may be substantially parallel with or below top surface 510 of base 502. In an example, while information handling system 500 is in a low power state, such that a lid is closed, currents may be removed from customizable click feeling keys 504, 506, and 508. Based on the currents being removed, the magnetic fields from electromagnetics 522, 524, 532, 534, 542, and 544 may disappear. In response to the magnetic fields disappearing, keycaps 520, 530, and 540 may fall due to gravity and attraction forces between keycap magnets and the ferromagnetic materials inside the electromagnets.

In an example, keycap magnet 550 may be attracted to electromagnet 522, keycap magnet 552 may be attracted to electromagnet 524 keycap magnet 560 may be attracted to electromagnet 532, keycap magnet 562 may be attracted to electromagnet 534, keycap magnet 570 may be attracted to electromagnet 544, and keycap magnet 572 may be attracted to electromagnet 542. Additionally, the attraction forces may also lock keycaps 520, 530, and 540 to prevent them from popping up and damaging a display of information handling system 500.

FIG. 6 illustrates customizable click feeling keys 504, 506, and 508 in an open position. In certain examples, top surfaces 526, 536, and 546 of respective keycaps 520, 530, and 540 may be above top surface 510 of base 502. In an example, while customizable click feeling keys 504, 506, and 508 in an open position, the bottom surface of keycaps 520, 530, and 540 may also be above top surface 510. However, customizable click feeling keys 504, 506, and 508 in an open position without the bottom surface of keycaps 520, 530, and 540 being above top surface 510 as long as top surfaces 526, 536, and 546 of respective keycaps 520, 530, and 540 are above top surface 510.

In an example, when information handling system 500 is opened or a powered up state, currents may be provided to electromagnets 522, 524, 532, 534, 542, and 544. In response to the currents, electromagnets 522, 524, 532, 534, 542, and 544 may create magnetic poles that are the same as the magnetics poles of keycaps 550, 552, 560, 562, 570, and 572. Based on the magnetic poles of electromagnets 522, 524, 532, 534, 542, and 544 being the same as the magnetics poles of keycaps 550, 552, 560, 562, 570, and 572, repelling forces may be generated between corresponding electromagnets and keycap magnets. For example, a repelling force 610 may be created between electromagnet 522 and keycap magnet 550, and a repelling force 612 may be created between electromagnet 524 and keycap magnet 552. Based on repelling forces 610 and 612, customized click feeling key 504 may pop up from within base 502, such that top surface 526 of keycap 520 may be above top surface 510 of the base.

In an example, a repelling force 620 may be created between electromagnet 532 and keycap magnet 560, and a repelling force 622 may be created between electromagnet 534 and keycap magnet 562. Based on repelling forces 620 and 622, customized click feeling key 506 may pop up from within base 502, such that top surface 536 of keycap 530 may be above top surface 510 of the base. Additionally, a repelling force 630 may be created between electromagnet 542 and keycap magnet 570, and a repelling force 632 may be created between electromagnet 544 and keycap magnet 572. Based on repelling forces 630 and 632, customized click feeling key 508 may pop up from within base 502, such that top surface 546 of keycap 540 may be above top surface 510 of the base.

In certain examples, a user of information handling system 500 may setup a customized pop up sequence for the customized click feeling keys 504, 506, and 508 of a keyboard. When information handling system 500 is started or powered up, customized click feeling keys 504, 506, and 508 may pop up according to a unique keyboard pop up sequence as will be described with respect to FIG. 8 below.

Figure 7:
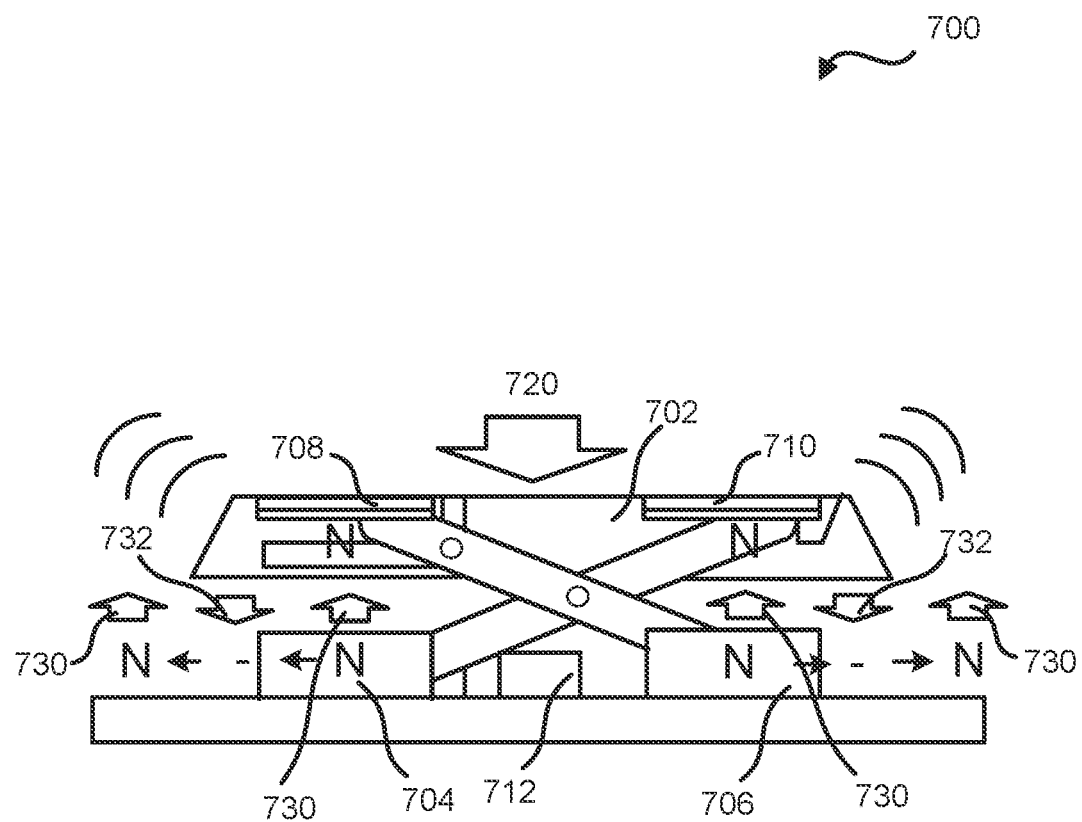
FIG. 7 is a side view of a customizable click feeling key with haptic feedback according to at least one embodiment of the present disclosure.

FIG. 7 is a diagram of a customizable click feeling key 700 with haptic feedback according to at least one embodiment of the present disclosure. Customized click feeling key 700 may be substantially similar to keys 120 of FIG. 1, customized click feeling key 200 of FIG. 2, customized click feeling key 402 of FIG. 4, and customized click feeling keys 504, 506, and 508 of FIG. 5. Customized click feeling key 700 includes a keycap 702, electromagnets 704 and 706, keycap magnets 708 and 710, and a hall effect sensor 712.

In an example, a user of an information handling system, such as information handling system 100, may select a haptic feedback mode. After the haptic feedback mode has been selected, a user force may be applied in the direction of arrow 720 to customizable click feeling key 700. In an example, the user force in direction of arrow 720 may be detected in any suitable manner. For example, hall effect sensor 712 may capture a motion of keycap 702 by analyzing a magnetic flux density change between electromagnet 704 and keycap magnet 708 and analyzing a magnetic flux density change between electromagnet 706 and keycap magnet 710.

Based on the detected magnetic flux density change, electromagnets 704 and 706 may be rapidly activated and deactivated. When electromagnets 704 and 706 are activated, the electromagnets may have the same magnetic polarity as keycap magnets 708 and 710, such as a north magnetic polarity. Based on electromagnets 704 and 706 having the same magnetic polarity as keycap magnets 708 and 710, keycap 702 may be forced upwards as indicated by arrows 730.

When electromagnets 704 and 706 are deactivated, the electromagnets may no longer have a magnetic polarity and as a result keycap magnets 708 and 710 may not be repelled by the electromagnets. Based on electromagnets 704 and 706 not producing magnetic polarities, keycap 702 drop downward toward the electromagnets as indicated by arrows 732. In an example, the keycap 702 may drop downward toward electromagnets 704 and 706 based on any suitable forces. For example, keycap 702 may drop based on a gravity. Additionally, keycap magnets 708 and 710 may be attracted to the ferromagnetic materials in electromagnets 704 and 706, which may cause keycap 702 to move toward the electromagnets.

In certain examples, a particular length of time may expire between the activating and deactivating of electromagnets 704 and 706. In an example, the length of time may be any suitable amount of time, such as 1 millisecond, 2 milliseconds, 3 milliseconds, or the like. The length of time may create a rapid change in the magnetic polarity of electromagnets 704 and 706, which may cause keycap 702 to vibrate up and down. In an example, vibrating of keycap 702 may create haptic feedback, which may be used to provide real-time haptic feedback in gaming operations of an information handling system, such as information handling system 100 of FIG. 1.

Figure 8:
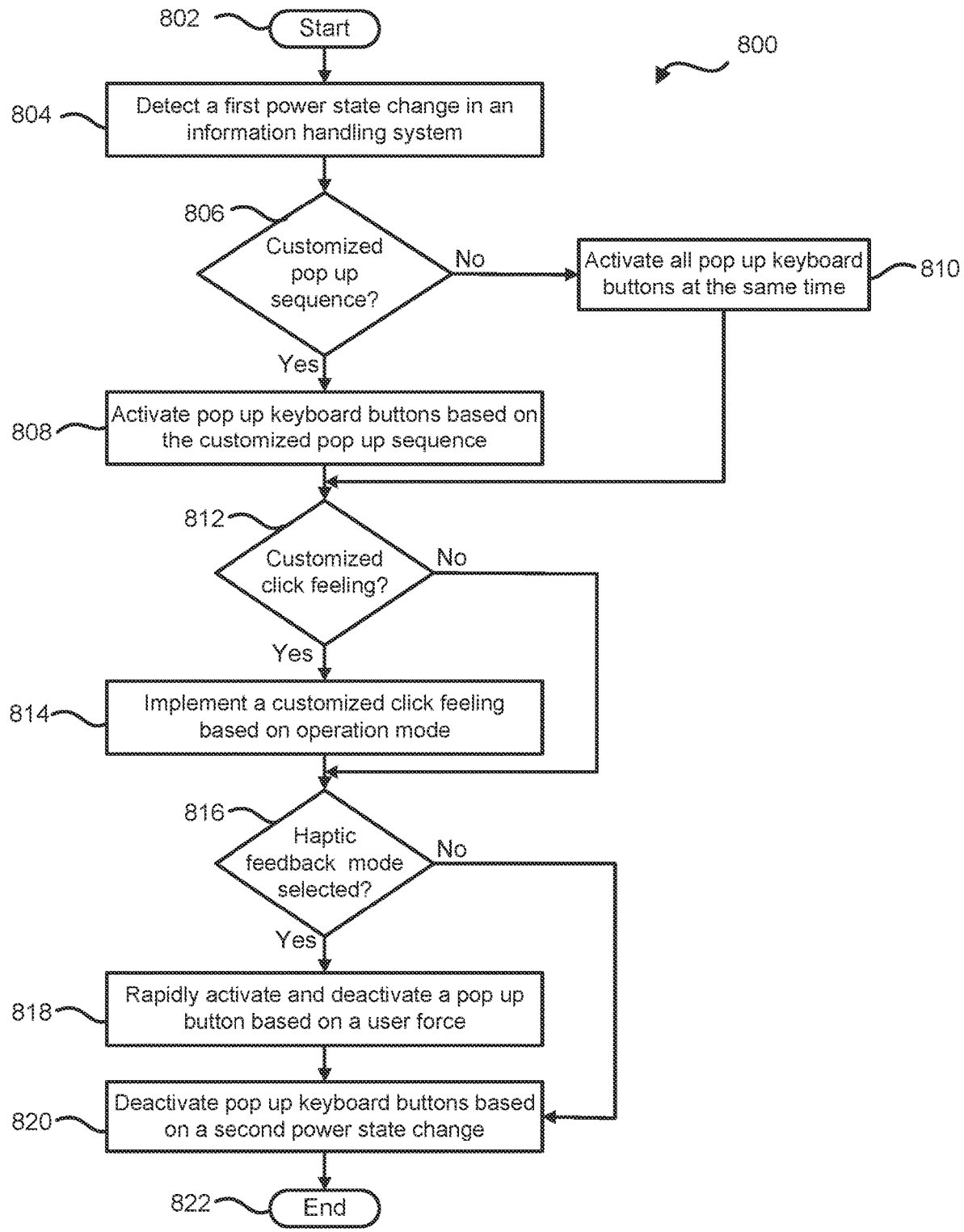
FIG. 8 is a flow diagram of a method for controlling one or more customizable click feeling keys according to at least one embodiment of the present disclosure.

FIG. 8 is a flow diagram of a method 800 for controlling one or more customizable click feeling keys according to at least one embodiment of the present disclosure, starting at block 802. In an example, the method 800 may be performed by any suitable component including, but not limited to, hall effect sensor 404 of FIG. 4, processor 406 of FIG. 4, digital resistor 408 of FIG. 4, or any other suitable component. Not every method step set forth in this flow diagram is always necessary, and certain steps of the methods may be combined, performed simultaneously, in a different order, or perhaps omitted, without varying from the scope of the disclosure.

At block 804, a first power state change of an information handling system is detected. In an example, the power state change may be from a low power state to an activate power state. For example, the low power state of the information handling system may be a powered down state, a sleep state, or the like. The activate power state may be a power state during a boot operation of the information handling system, during execution of an operating system (OS) in the information handling system, or the like. If the information handling system is a portable computer, such as a laptop computer, the power state change may result from the lid or top, such as top 104 of FIG. 1, being opened.

At block 806, a determination is made whether a customized pop-up sequence is stored in a memory of the information handling system. In certain examples, a customized pop-up sequence may be any suitable manner or sequence to activate the customizable click feeling keys in a keyboard of the information handling system. In an example, when a customizable click feeling key is activated, current is provided through one or more electromagnets within the customizable click feeling key. In response to the current, the electromagnets generate a magnetic field, which in turn repels a keycap magnet of the customizable click feeling key. The repulsion of the keycap magnet from the electromagnet may cause a keycap of the customizable click feeling key to pop-up from a closed position to an open position.

If a customized pop-up sequence is stored in the memory, customizable click feeling keys are activated based on the customized pop-up sequence at block 808. For example, the customized pop-up sequence may cause different subsets of the customizable click feeling keys to be activated at different times. In an example, the customizable click feeling keys may be activated in a pattern from one side of the keyboard to the other, such as the click feeling keys may pop-up a 'wave' pattern across the keyboard. In another example, the customizable click feeling keys may be activated in a random pattern, such that the click feeling keys may pop-up at random. While only two customized pop-up sequences have been described, a customized pop-up sequence may be any design selected by a user of the information handling system.

If a customized pop-up sequence is not stored in the memory, all customizable click feeling keys are activated at the same time at block 810. In certain examples, each customizable click feeling key may have its own and separate connection to a current source. The separate connections for each of the customizable click feeling keys may enable the different keys to be activated at different times, at the same time, or the like. At block 812, a determination is made whether one or more customized click feeling settings are stored in the memory. In an example, each of the different customized click feeling settings may be created based on a different amount of force being created between an electromagnet and a keycap magnet of the customized click feeling key. In this example, the different forces may create different click feelings by requiring different amounts of user forces to click the customized click feeling key. In certain examples, each of the different customized click feeling settings may correspond to a different operation mode of the information handling system.

If one or more customized click feeling settings are stored, a customized click feeling is implemented based on an operation mode of the information handling system at block 814 and the flow continues at block 816. In an example, the operation mode of the information handling system is determined, and the corresponding customized click feeling setting is implemented. In certain examples, the operation mode of the information handling system may be any suitable mode of the information handling system including, but not limited to, a racing mode, a gaming mode, and a normal mode.

If one or more customized click feeling settings are not stored, a determination is made whether a haptic feedback mode has been selected at block 816. If the haptic feedback mode is not selected, the flow continues at block 820. If the haptic feedback mode has been selected, a customizable click feeling key is rapidly activated and deactivated based on a user force on the customizable click feeling key at block 818. In an example, the user force may be exerted in an opposite direction of a force exerted on keycap magnet by the activated electromagnet. At block 820, the customizable click feeling keys are deactivated based on a second power state change, and the flow ends at block 822.

Figure 9:
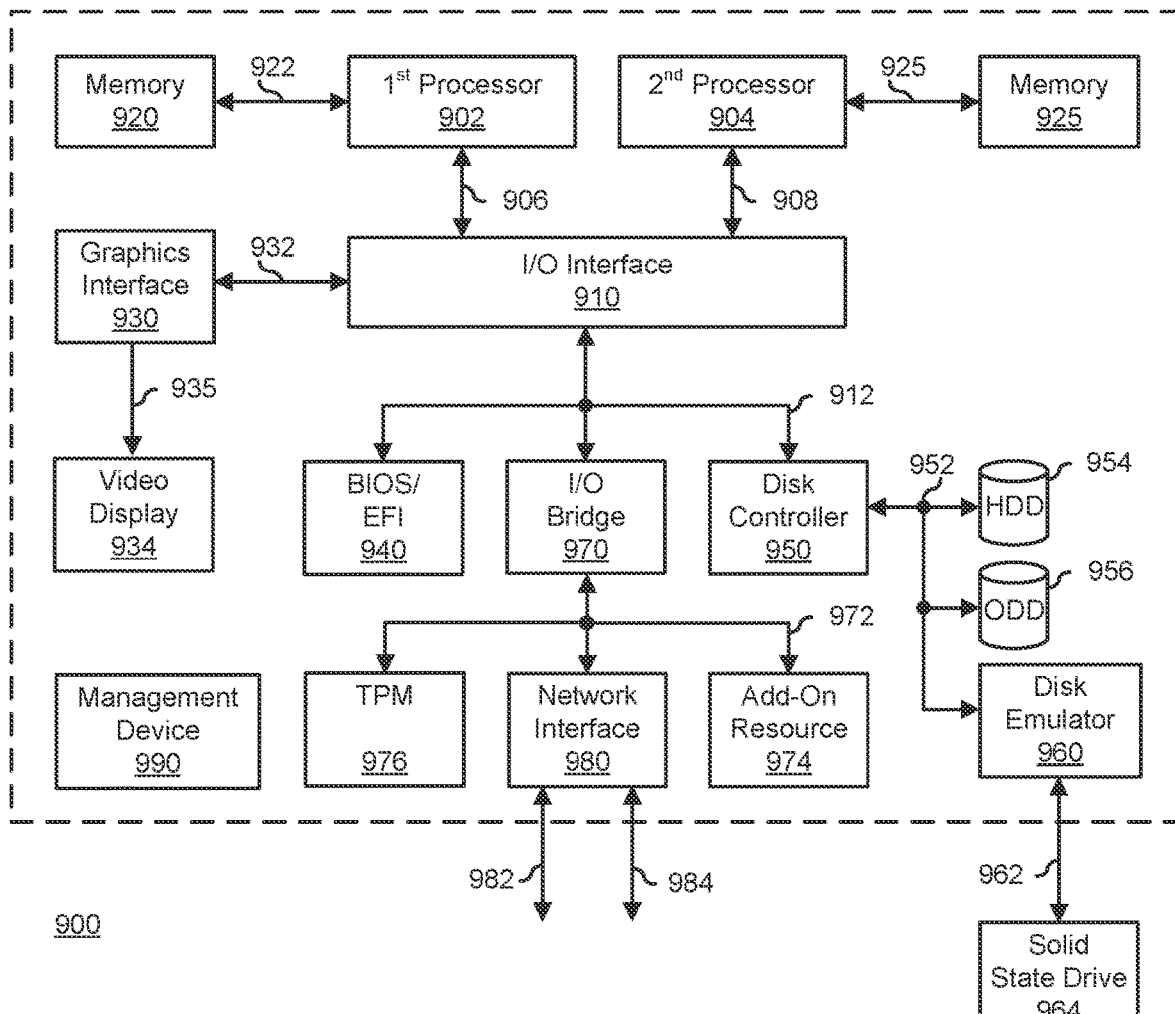
FIG. 9 is a block diagram of a general information handling system according to an embodiment of the present disclosure.

FIG. 9 shows a generalized embodiment of an information handling system 900 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 900 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 900 can include processing resources for executing machine-executable code, such as a central processing unit (CPU), a programmable logic array (PLA), an embedded device such as a System-on-a-Chip (SoC), or other control logic hardware. Information handling system 900 can also include one or more computer-readable medium for storing machine-executable code, such as software or data. Additional components of information handling system 900 can include one or more storage devices that can store machine-executable code, one or more communications ports for communicating with external devices, and various input and output (I/O) devices, such as a keyboard, a mouse, and a video display. Information handling system 900 can also include one or more buses operable to transmit information between the various hardware components.

Information handling system 900 can include devices or modules that embody one or more of the devices or modules described below and operates to perform one or more of the methods described below. Information handling system 900 includes a processors 902 and 904, an input/output (I/O) interface 910, memories 920 and 925, a graphics interface 930, a basic input and output system/universal extensible firmware interface (BIOS/UEFI) module 940, a disk controller 950, a hard disk drive (HDD) 954, an optical disk drive (ODD) 956, a disk emulator 960 connected to an external solid state drive (SSD) 962, an I/O bridge 970, one or more add-on resources 974, a trusted platform module (TPM) 976, a network interface 980, a management device 990, and a power supply 995. Processors 902 and 904, I/O interface 910, memory 920, graphics interface 930, BIOS/UEFI module 940, disk controller 950, HDD 954, ODD 956, disk emulator 960, SSD 962, I/O bridge 970, add-on resources 974, TPM 976, and network interface 980 operate together to provide a host environment of information handling system 900 that operates to provide the data processing functionality of the information handling system. The host environment operates to execute machine-executable code, including platform BIOS/UEFI code, device firmware, operating system code, applications, programs, and the like, to perform the data processing tasks associated with information handling system 900.

In the host environment, processor 902 is connected to I/O interface 910 via processor interface 906, and processor 904 is connected to the I/O interface via processor interface 908. Memory 920 is connected to processor 902 via a memory interface 922. Memory 925 is connected to processor 904 via a memory interface 927. Graphics interface 930 is connected to I/O interface 910 via a graphics interface 932 and provides a video display output 936 to a video display 934. In a particular embodiment, information handling system 900 includes separate memories that are dedicated to each of processors 902 and 904 via separate memory interfaces. An example of memories 920 and 930 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 940, disk controller 950, and I/O bridge 970 are connected to I/O interface 910 via an I/O channel 912. An example of I/O channel 912 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 910 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 940 includes BIOS/UEFI code operable to detect resources within information handling system 900, to provide drivers for the resources, initialize the resources, and access the resources. BIOS/UEFI module 940 includes code that operates to detect resources within information handling system 900, to provide drivers for the resources, to initialize the resources, and to access the resources.

Disk controller 950 includes a disk interface 952 that connects the disk controller to HDD 954, to ODD 956, and to disk emulator 960. An example of disk interface 952 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 960 permits SSD 964 to be connected to information handling system 900 via an external interface 962. An example of external interface 962 includes a USB interface, an IEEE 9394 (Firewire) interface, a proprietary interface, or a combination thereof. Alternatively, solid-state drive 964 can be disposed within information handling system 900.

I/O bridge 970 includes a peripheral interface 972 that connects the I/O bridge to add-on resource 974, to TPM 976, and to network interface 980. Peripheral interface 972 can be the same type of interface as I/O channel 912 or can be a different type of interface. As such, I/O bridge 970 extends the capacity of I/O channel 912 when peripheral interface 972 and the I/O channel are of the same type, and the I/O bridge translates information from a format suitable to the I/O channel to a format suitable to the peripheral channel 972 when they are of a different type. Add-on resource 974 can include a data storage system, an additional graphics interface, a network interface card (NIC), a sound/video processing card, another add-on resource, or a combination thereof. Add-on resource 974 can be on a main circuit board, on separate circuit board or add-in card disposed within information handling system 900, a device that is external to the information handling system, or a combination thereof.

Network interface 980 represents a NIC disposed within information handling system 900, on a main circuit board of the information handling system, integrated onto another component such as I/O interface 910, in another suitable location, or a combination thereof. Network interface device 980 includes network channels 982 and 984 that provide interfaces to devices that are external to information handling system 900. In a particular embodiment, network channels 982 and 984 are of a different type than peripheral channel 972 and network interface 980 translates information from a format suitable to the peripheral channel to a format suitable to external devices. An example of network channels 982 and 984 includes InfiniBand channels, Fibre Channel channels, Gigabit Ethernet channels, proprietary channel architectures, or a combination thereof. Network channels 982 and 984 can be connected to external network resources (not illustrated). The network resource can include another information handling system, a data storage system, another network, a grid management system, another suitable resource, or a combination thereof.

Management device 990 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 900. In particular, management device 990 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 900, such as system cooling fans and power supplies. Management device 990 can include a network connection to an external management system, and the management device can communicate with the management system to report status information for information handling system 900, to receive BIOS/UEFI or system firmware updates, or to perform other task for managing and controlling the operation of information handling system 900.

Management device 990 can operate off of a separate power plane from the components of the host environment so that the management device receives power to manage information handling system 900 when the information handling system is otherwise shut down. An example of management device 990 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 990 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
   a keyboard having a plurality of customizable click feeling keys including a first customizable click feeling key, wherein the first customizable click feeling key includes:
      a keycap;
      a keycap magnet securely mounted to an inner surface of the keycap, the keycap magnet including a first magnetic polarity portion and a second magnetic polarity portion; and
      an electromagnet; and
   a processor to communicate individually with each of the customizable click feeling keys, the processor to:
      determine a mode of the information handling system;
      based on the mode being a first mode, provide a first command signal to the digital resistor, wherein based on the first command signal, the digital resistor provides a first current to the electromagnet to generate a first magnetic pole strength within the electromagnet; and
      based on the mode being a second mode, provide a second command signal to the digital resistor, wherein based on the second command signal, the digital resistor provides a second current to the electromagnet to generate a second magnetic pole strength within the electromagnet, wherein the second magnetic pole strength creates a stronger repulsion force between the electromagnet and the keycap magnet, wherein the first and second currents cause a portion of the electromagnet nearest the keycap magnet to be a same magnetic polarity as the second magnetic polarity portion.

2. The information handling system of claim 1, wherein processor is further to:
   detect a power state change in the information handling system;
   in response to the power state change, determine whether a customized pop up sequence is stored in a memory of the information handling system; and
   based on the customized popup sequence being stored in the memory, activate the customizable click feeling keys according to the customized pop sequence.

3. The information handling system of claim 1, wherein when based on the first current being provided to the electromagnet, the keycap is in an open position based on a repulsion force between the second magnetic polarity portion of the keycap magnet and the electromagnet.

4. The information handling system of claim 1, wherein when no current is provided to the electromagnet, the keycap is in a closed position based on the second magnetic polarity portion of the keycap magnet being attracted to the electromagnet.

5. The information handling system of claim 1, wherein processor is further to:
   detect a selection of a haptic feedback mode;
   in response to the selection of the haptic feedback mode, determine whether a user force is applied to the keycap; and
   based on the user force being applied to the keycap, rapidly activate and deactivate the electromagnet.

6. The information handling system of claim 5, wherein the rapid activation and deactivation of the electromagnet causes a distance between the keycap magnet and the electromagnet to rapidly increase and decrease.

7. The information handling system of claim 5, wherein the first customizable click feeling key further includes a hall effect sensor, wherein the hall effect sensor detects the user force based on a change of a magnetic flux density of the electromagnet.

8. A method comprising:
   determining, by a processor of an information handling system, a mode of the information handling system;
   based on the mode being a first mode, providing a first command signal to a digital resistor of a keyboard in the information handling system, wherein based on the first command signal, the digital resistor provides a first current to an electromagnet to generate a first magnetic pole strength within the electromagnet; and
   based on the mode being a second mode, providing a second command signal to the digital resistor, wherein based on the second command signal, the digital resistor provides a second current to the electromagnet to generate a second magnetic pole strength within the electromagnet, wherein the second magnetic pole strength creates a stronger repulsion force between the electromagnet and a keycap magnet, wherein the keycap magnet is securely mounted to an inner surface of a keycap, the keycap magnet includes first and second magnetic polarity portions.

9. The method of claim 8, further comprising:
   detecting a power state change in the information handling system;
   in response to the power state change, determining whether a customized pop up sequence is stored in a memory of the information handling system; and
   based on the customized popup sequence being stored in the memory, activating a plurality of customizable click feeling keys according to the customized pop sequence.

10. The method of claim 8, wherein the first and second currents cause a portion of the electromagnet nearest the keycap magnet to be a same magnetic polarity as the second magnetic polarity portion.

11. The method of claim 10, wherein when based on providing of the first current to the electromagnet, biasing the keycap of a first customizable click feeling key in an open position based on a repulsion force between the second magnetic polarity portion of the keycap and the electromagnet.

12. The method of claim 8, wherein when no current is provided to the electromagnet, biasing the keycap of a first customizable click feeling key in a closed position based on the second magnetic polarity portion of the keycap being attracted to the electromagnet.

13. The method of claim 8, further comprising:
   detecting a selection of a haptic feedback mode; and
   in response to the selection of the haptic feedback mode, determining whether a user force is applied to the keycap; and
   based on the user force being applied to the keycap, rapidly activating and deactivating the electromagnet.

14. The method of claim 13, wherein the rapid activating and deactivating of the electromagnet causes a distance between the keycap magnet and the electromagnet to rapidly increase and decrease.

15. The method of claim 13, wherein the determining of the user force, the method further includes: determining, by a hall effect sensor, a change of a magnetic flux density of the electromagnet.

16. An information handling system comprising:
   a keyboard having a plurality of customizable click feeling keys including a first customizable click feeling key, wherein the first customizable click feeling key includes:
      a keycap;
      a keycap magnet securely mounted to an inner surface of the keycap, the keycap magnet includes a first magnetic polarity portion and a second magnetic polarity portion;
      a digital resistor; and
      an electromagnet; and
   a processor to communicate individually with each of the customizable click feeling keys, the processor to:
      determine a mode of the information handling system;
      if the mode is a first mode, then provide a first command signal to the digital resistor, wherein based on the first command signal, the digital resistor provides a first current to the electromagnet to generate a first magnetic pole strength within the electromagnet; and
      if the mode is a second mode, then provide a second command signal to the digital resistor, wherein based on the second command signal, the digital resistor provides a second current to the electromagnet to generate a second magnetic pole strength within the electromagnet, wherein the second magnetic pole strength creates a stronger repulsion force between the electromagnet and the keycap magnet.

17. The information handling system of claim 16, wherein processor further to:
   detect a power state change in the information handling system;
   in response to the power state change, determine whether a customized pop up sequence is stored in a memory of the information handling system; and
   based on the customized popup sequence being stored in the memory, activate the customizable click feeling keys according to the customized pop sequence.

18. The information handling system of claim 16, wherein the processor further to:
   detect a selection of a haptic feedback mode;
   in response to the selection of the haptic feedback mode, determine whether a user force is applied to the keycap; and
   based on the user force being applied to the keycap, rapidly activate and deactivate the electromagnet.

19. The information handling system of claim 18, wherein the first customizable click feeling key further includes a hall effect sensor, wherein the hall effect sensor detects the user force based on a change of a magnetic flux density of the electromagnet.

* * * * *